(12) United States Patent
Jang

(10) Patent No.: US 9,796,440 B2
(45) Date of Patent: Oct. 24, 2017

(54) COMMON CRP CART FOR MULTI VEHICLE MODEL

(75) Inventor: Yoon Jang, Incheon (KR)

(73) Assignee: HYUNDAI MOTOR COMPANY, Seoul (KR)

(*) Notice: Subject to any disclaimer, the term of this patent is extended or adjusted under 35 U.S.C. 154(b) by 1496 days.

(21) Appl. No.: 13/554,031

(22) Filed: Jul. 20, 2012

(65) Prior Publication Data
US 2013/0113148 A1 May 9, 2013

(30) Foreign Application Priority Data

Nov. 7, 2011 (KR) .................. 10-2011-0115384

(51) Int. Cl.
| | |
|---|---|
| *B62D 65/18* | (2006.01) |
| *B23P 21/00* | (2006.01) |
| *B25J 9/00* | (2006.01) |
| *B62D 65/02* | (2006.01) |

(52) U.S. Cl.
CPC ............ *B62D 65/18* (2013.01); *B23P 21/004* (2013.01); *B25J 9/0084* (2013.01); *B62D 65/026* (2013.01)

(58) Field of Classification Search
CPC ...... B62D 65/18; B62D 65/026; B62D 65/06; B23P 19/04; B23P 21/00; B23P 21/004; B23P 2700/50; B23K 37/00; B25B 11/02; B25J 9/0084; B25J 9/0096; B25J 9/026; Y10T 29/53539
USPC ............ 269/37, 40, 45, 50, 51, 55, 54, 54.4; 29/430, 464, 469, 559, 783, 791, 822, 29/824, 897.2
See application file for complete search history.

(56) References Cited

U.S. PATENT DOCUMENTS

| | | | | |
|---|---|---|---|---|
| 4,589,184 | A * | 5/1986 | Asano .................. | B25J 9/0093 198/575 |
| 5,123,161 | A * | 6/1992 | Kubo .................... | B62D 65/02 219/79 |
| 5,188,276 | A * | 2/1993 | Furuya ................ | B62D 65/06 228/47.1 |
| 5,267,683 | A * | 12/1993 | Hamada ............. | B23K 37/0235 228/4.1 |

(Continued)

FOREIGN PATENT DOCUMENTS

| | | |
|---|---|---|
| JP | S61232969 A | 10/1986 |
| JP | S62110580 A | 5/1987 |

(Continued)

*Primary Examiner* — Joseph J Hail
*Assistant Examiner* — Tyrone V Hall, Jr.
(74) *Attorney, Agent, or Firm* — Mintz Levin Cohn Ferris Glovsky and Popeo, P.C.; Peter F. Corless

(57) ABSTRACT

A common CRP cart for multiple vehicle models is disclosed. The common CRP cart may clamp a cowl panel, a roof rail and a package tray for assembling a vehicle body, and may move upwardly and downwardly at a working room for a build-up process. The common CRP cart may include a frame; a first aligning unit connected to one portion of the frame for clamping a cowl panel of various vehicle models having different specifications; a second aligning unit connected to another portion of the frame for clamping a roof rail of various vehicle models having different specifications; and a third aligning unit connected to the other portion of the frame for clamping a package tray of various vehicle models having different specifications.

9 Claims, 7 Drawing Sheets

(56) References Cited

U.S. PATENT DOCUMENTS

| | | | | |
|---|---|---|---|---|
| 5,778,517 A * | 7/1998 | Amesbichler | ......... | B62D 65/06 29/281.4 |
| 6,339,874 B2 * | 1/2002 | Segawa | ................ | B23P 21/004 29/281.4 |
| 6,554,119 B2 * | 4/2003 | Oldford | ................ | B62D 65/18 198/345.3 |
| 6,643,905 B2 * | 11/2003 | Rhoads | ................ | B62D 65/06 269/50 |
| 8,485,575 B2 * | 7/2013 | Yeum | ................ | B25J 15/0052 269/905 |
| 2002/0170160 A1 * | 11/2002 | Savoy | .................... | B62D 65/06 29/407.1 |
| 2006/0162140 A1 * | 7/2006 | Frauen | ................ | B64F 5/0009 29/407.04 |
| 2008/0000069 A1 * | 1/2008 | Savoy | .................... | B62D 65/02 29/430 |
| 2010/0287767 A1 * | 11/2010 | Woo | ...................... | B23P 21/004 29/823 |
| 2012/0145849 A1 * | 6/2012 | Yeum | ...................... | B25B 11/02 248/220.21 |
| 2012/0146274 A1 * | 6/2012 | Kim | ..................... | B62D 65/026 269/61 |
| 2013/0113148 A1 * | 5/2013 | Jang | ...................... | B62D 65/18 269/58 |
| 2013/0113149 A1 * | 5/2013 | Yeum | ................. | B23K 37/0443 269/59 |

FOREIGN PATENT DOCUMENTS

| | | |
|---|---|---|
| JP | 08-207843 A | 8/1996 |
| JP | 2002-187032 A | 7/2002 |
| JP | 2005-014017 A | 1/2005 |
| JP | 3655136 | 3/2005 |
| KR | 10-2005-0005702 A | 1/2005 |
| KR | 10-0887970 B1 | 3/2009 |
| KR | 10-0897267 B1 | 5/2009 |
| KR | 10-2009-0058240 | 6/2009 |
| KR | 10-2009-0098157 | 9/2009 |
| KR | 10-0965098 B1 | 6/2010 |

* cited by examiner

# COMMON CRP CART FOR MULTI VEHICLE MODEL

CROSS-REFERENCE TO RELATED APPLICATION

This application claims priority to and the benefit of Korean Patent Application No. 10-2011-0115384 filed in the Korean Intellectual Property Office on Nov. 7, 2011, the entire contents of which are incorporated herein by reference.

BACKGROUND OF THE INVENTION (a) Field of the Invention

The present invention relates to a vehicle body assemble system. More particularly, the present invention relates to a common CRP cart for multiple vehicle models undergoing a vehicle body build-up process.

(b) Description of the Related Art

Generally, at a first stage of a vehicle manufacturing process, vehicle panels are transmitted to a vehicle body factory after they have been manufactured through various press apparatus. The panels are assembled with each other so as to form a vehicle body of a body in white (B.I.W) shape.

The vehicle body includes a floor panel that supports a driving portion (such as an engine, a driving axle and a seat), two side panels that form side portions of the vehicle body, a roof panel that forms an upper portion of the vehicle body, a plurality of roof rails, a cowl panel, a back panel, package tray and so on.

These elements are assembled to form the vehicle body in vehicle body build-up process, which is also referred to as a main buck process.

In the vehicle body build-up process, the floor panel is assembled with the back panel, and then the other panels, the roof panel, the roof rail, the cowl panel and package tray are assembled by welding through a vehicle body assembly system.

Meanwhile, the vehicle body assembly system is provided with a cart (which may be referred to herein as a CRP cart) which clamps the cowl panel (C), the roof rail (R) and the package tray (P) and matches them up with the side panels.

The CRP cart, which clamps the cowl panel, the roof rail and the package tray, moves downwardly to match up with a side gate in the vehicle body build-up process working room.

However, conventional CRP carts are designed for specific vehicle models, particularly because the CRP cart is operated according to specific jigs which are fitted to specific vehicle models. Thus, a CRP cart may not be used for a variety of vehicle models, but rather, each CRP cart is exclusively designed and used for the cowl panels, roof rails and package trays of a particular vehicle model.

As a result, mass production of various vehicle models is more difficult, and the equipment required for transferring, loading, and clamping the panels is very complex. Further, manufacturing time increases, and initial investment costs also increase.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a common CRP cart for multiple vehicle models. In particular, the present invention provides a common CRP cart that can be used in a vehicle body build-up process for a variety of different vehicle models.

According to one aspect of the invention, a common CRP cart for multiple vehicle models is provided which may clamp a cowl panel, a roof rail and a package tray, and which assembles the parts to form a vehicle body. The CRP cart may move upward and downward in a working room for a build-up process. The common CRP cart may include a frame; a first aligning unit connected to one portion of the frame, and being configured and arranged for clamping a cowl panel of a variety of vehicle models having different specifications; a second aligning unit connected to another portion of the frame, and being configured and arranged for clamping a roof rail of a variety of vehicle models having different specifications; and a third aligning unit connected to the other portion of the frame (i.e. the portion of the frame to which the second aligning unit is connected), and being configured and arranged for clamping a package tray of a variety of vehicle models having different specifications.

The first aligning unit may include at least one first aligning pin that is movable so as to correspond to a position of a variety of cowl panels of various vehicle models having different specifications. The first aligning unit may further include a first driving portion, which may be a three-dimensional motor cylinder and may move the first aligning pin along a moving direction of the vehicle body, a width direction of the vehicle body, and along upward/downward directions of the vehicle body. The first aligning unit may further include at least one first clamper configured and arranged for clamping the cowl panel.

According to various embodiments, the first aligning unit may further include a second driving portion which may be a two-dimensional motor cylinder, and which may move the first clamper along a moving direction of the vehicle body, and along upward/downward directions of the vehicle body.

According to various embodiments, the first clamper may be a swivel clamper which may improve the ability of the first clamper to match clamping surface characteristics of the cowl panel despite variations in slope.

According to various embodiments, the first aligning pin may be mounted to a mounting block connected to the first driving portion, and the mounting block may be provided with a first pusher which pushes a corresponding or matching portion of the cowl panel.

According to various embodiments, the second aligning unit may be positioned between the first and the third aligning unit. A pair of second aligning units may be provided for clamping a front roof rail and a rear roof rail respectively.

According to various embodiments, the second aligning unit may include a first pin clamper comprising at least one second aligning pin that is movable so as to correspond to a position of a variety of roof rails of various vehicle models having different specifications. The second aligning unit may further include a third driving portion which may be a three-dimensional motor cylinder and may move the first pin clamper along a moving direction of the vehicle body, a width direction of the vehicle body, and along upward/downward directions of the vehicle body. The second aligning unit may further include a holding portion which pushes and clamps the roof rail along a width direction of the roof rail, and a fourth driving portion which may move the holding portion along a moving direction of the vehicle body.

According to various embodiments, the holding portion may be provided with a plurality of holding fingers which may be movable along a width direction of the roof rail. The holding fingers may be driven along a width direction of the roof rail by operation of a fifth driving portion connected to the fourth driving portion.

According to various embodiments, the holding fingers may be provided with clamping grooves which are formed on opposite sides of the roof rail, and may be "V" shaped or the like.

According to various embodiments, the third aligning unit may include a second pin clamper comprising at least one third aligning pin that is movable so as to correspond to a position of a variety of package trays of various vehicle models having different specifications. The third aligning unit may further include a sixth driving portion which may be a three-dimensional motor cylinder and may move the second pin clamper along a moving direction of the vehicle body, a width direction of the vehicle body, and along upward/downward directions of the vehicle body. The third aligning unit may further include at least one second clamper configured and arranged for clamping the package tray.

According to various embodiments, the third aligning unit may further include a seventh driving portion which may be a two-dimensional motor cylinder and may move the second clamper along a moving direction of the vehicle body, and along upward/downward directions of the vehicle body.

The second clamper may be a swivel clamper which may improve the ability of the first clamper to match clamping surface characteristics of the package tray despite variations in slope.

According to various embodiments, the third aligning unit may further include a second pusher configured and arranged for pushing the package tray. An eighth driving portion may be provided which may be a two-dimensional motor cylinder and may move the second pusher along a moving direction of the vehicle body, and along upward/downward directions of the vehicle body.

According to various embodiments, the second pusher may include a push bar which is connected to the eighth driving portion and disposed along length direction of the package tray, and push blocks which may be disposed at both/opposing ends of the push bar for pushing/engaging a corresponding or matching portion of the package tray.

According to an exemplary embodiment of the present invention, the common CRP cart may further include a pin block unit mounted to the frame and connected to a side gate in vehicle body build-up process.

According embodiments of the present invention, the first, second, and third aligning units may be configured and arranged to clamp the cowl panel, the roof rail and the package tray of various vehicle models having different specifications.

Since the common CRP cart can be used to assemble a variety of vehicle models having different specifications, various vehicle models may be mass produced more easily, working hours may be reduced, and initial investment costs can be decreased.

BRIEF DESCRIPTION OF THE DRAWINGS

The drawings illustrate exemplary embodiments of the present invention and are not construed to limit any aspect of the invention.

Figure 1:
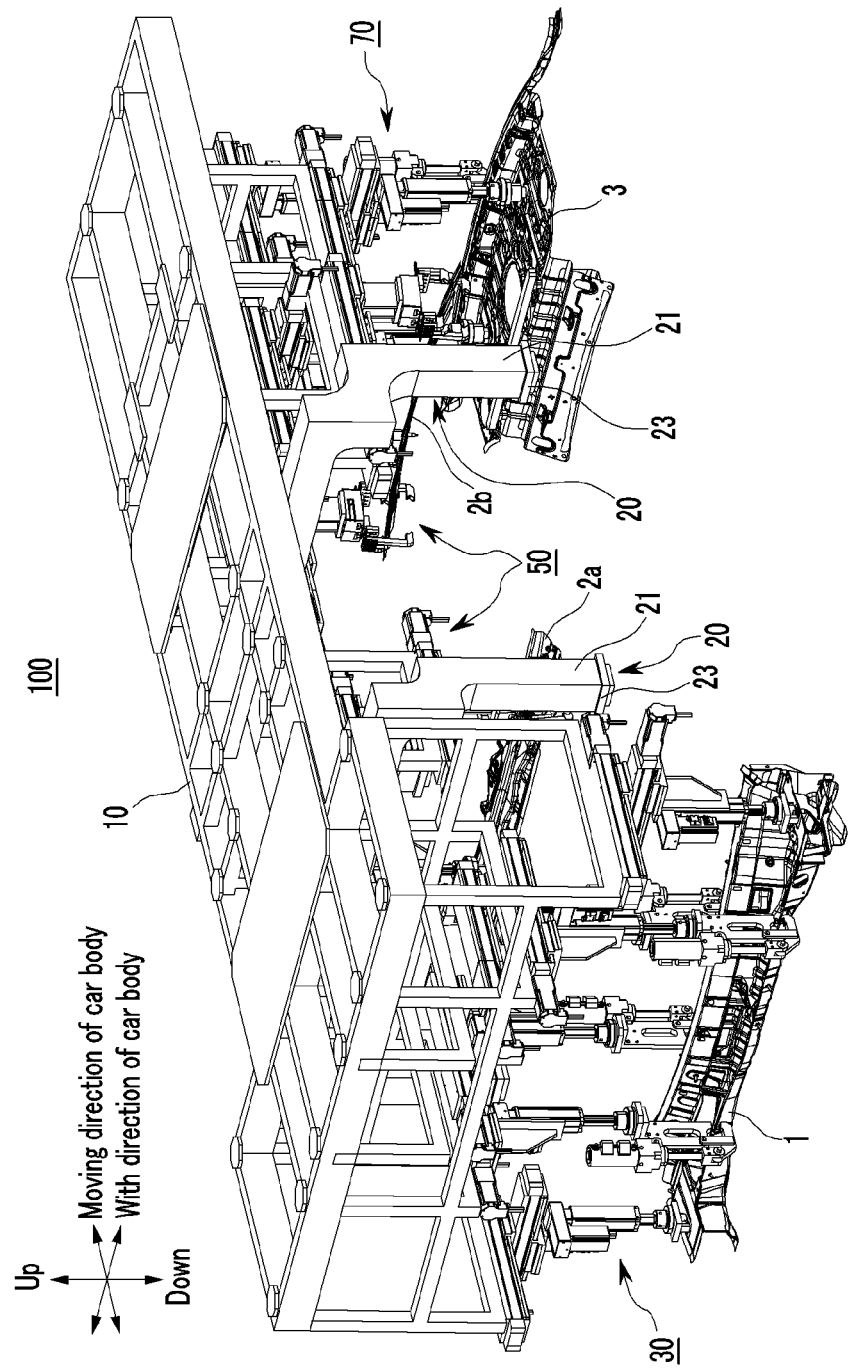
FIG. 1 is a perspective view of a common CRP cart for multiple vehicle models according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF SYMBOLS

| | |
|---|---|
| 1: cowl panel | 2a, 2b: roof rail |
| 3: package tray | 10: frame |
| 20: pin block unit | 21: mounting frame |
| 23: pin block | 30: first aligning unit |
| 31: first aligning pin | 32: first driving portion |
| 33: first clamper | 34: second driving portion |
| 35: first pusher | 50: second aligning unit |
| 51: first pin clamper | 52: third driving portion |
| 53: holding portion | 54: fourth driving portion |
| 55: fifth driving portion | 56: second aligning pin |
| 65: holding finger | 66: clamping groove |
| 69: fifth driving portion | 70: third aligning unit |
| 71: second pin clamper | 72: sixth driving portion |
| 73: second clamper | 74: seventh driving portion |
| 75: second pusher | 76: eighth driving portion |
| 77: third aligning pin | M1-M10: motor |

DETAILED DESCRIPTION OF THE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Description of components that are not necessary for explaining the present invention will be omitted, and the same constituent elements are denoted by the same reference numerals in this specification.

In addition, size and thickness of components shown in the drawings may be differ from real size and real thickness of the components for better comprehension and ease of description. Therefore, the present invention is not limited to those shown in the drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

FIG. 1 is a perspective view of a common CRP cart for multiple vehicle models (also referred to herein as "common CRP cart" or "CRP cart") according to an exemplary embodiment of the present invention.

Referring to FIG. 1, the common CRP cart 100 according to an exemplary embodiment of the present invention can be applied to a vehicle body build-up process (also commonly referred to as "a main buck process"), in which main buck assembly elements are transported from a sub-manufacturing line to form a vehicle body by welding.

In this case, the main buck assembly elements include a floor panel, side panels, a roof panel, a cowl panel, a roof rail and a package tray. The roof rail may include a front roof rail and a rear roof rail.

The floor panel may be transported to a working room of the vehicle body build-up process by a moving cart or the like, and the side panels may be matched up with the floor panel though a side gate of the main buck system.

Hereinafter, a vehicle body is defined as the assembled parts which include the floor panel and the side panels. A moving direction of the vehicle body is defined as the direction along which the floor panel extends.

In the related art, a moving direction of the vehicle body is defined as a "T direction", a width direction of the vehicle body is defined as an "L direction" and a height direction of the vehicle body is defined as an "H direction". However, in the following exemplary embodiment of the present invention, the directions will be referred to as the moving direction of the vehicle body, the width direction of the vehicle body, and the height direction of the vehicle body.

In an exemplary embodiment of the present invention, the common CRP cart 100 is used for clamping a cowl panel 1, roof rails 2a and 2b and a package tray 3 for assembling the vehicle body.

In this case, "CRP" is an abbreviation of the cowl panel ("C"), the roof rail ("R"), and the package tray ("P").

The common CRP cart 100 is movable at an upper portion of the working room of the vehicle body build-up process through a separated moving apparatus (commonly referred to in the related art as an "EMS") along the moving direction of the vehicle body.

The common CRP cart 100, while clamping the cowl panel 1, the roof rails 2a and 2b and the package tray 3, may be movable from an upper portion to a lower portion of the working room of the vehicle body build-up process to the vehicle body.

Further, the common CRP cart 100, may be movable downward from the upper portion of the working room to the vehicle body, and may be connected with the side gate (not shown).

According to an exemplary embodiment of the present invention, the common CRP cart 100 may clamp the cowl panel 1, the roof rails 2a and 2b and the package tray 3 of various vehicle models having different specifications in the vehicle body build-up process.

As shown in the figures, the common CRP cart 100 basically includes a frame 10, a pin block unit 20, a first aligning unit 30, a second aligning unit 50 and a third aligning unit 70.

In an exemplary embodiment of the present invention, the frame 10 is a base frame that supports constituent elements. The frame 10 can generally be in accordance with conventional frames and can include, for example, one or more brackets, one or more supporting blocks, and other commonly provided frame elements.

In the present exemplary embodiment, these constituent elements will together be referred to as the frame 10.

The frame 10 is connected to a moving apparatus (not shown) and includes a plurality of metal bars disposed along the moving direction, the width direction and the height direction of the vehicle body.

The frame 10 may be provided with boxes, balance weights and other components conventionally provided.

In an exemplary embodiment of the present invention, the pin block unit 20 is adapted to position the frame 10 as desired and may, for example, move the frame in a downward direction towards the vehicle body.

In particular, the pin block unit 20 may match up the frame 10 with the side gate (not shown), and may connect the pin block unit 20 thereto with pins and holes.

As shown in FIG. 1, two pin block units 20 may be provided as a pair fixed to the frame 10, with each pin block unit 20 is mounted along a length direction of the frame 10 (along the moving direction of the vehicle body) spaced at apart from each other.

As shown in FIG. 1, the pin block unit 20 may include a mounting frame 21 disposed in a width direction of the frame 10, and a pin block 23 which is disposed at both/opposing ends of mounting frame 21 and which may be connected to the side gate.

In an exemplary embodiment of the present invention, the first aligning unit 30 may accurately clamp the cowl panel 1 of various vehicle models having different specifications. As shown in FIG. 1, the first aligning unit 30 may be disposed at one portion of the frame 10.

Figure 2:
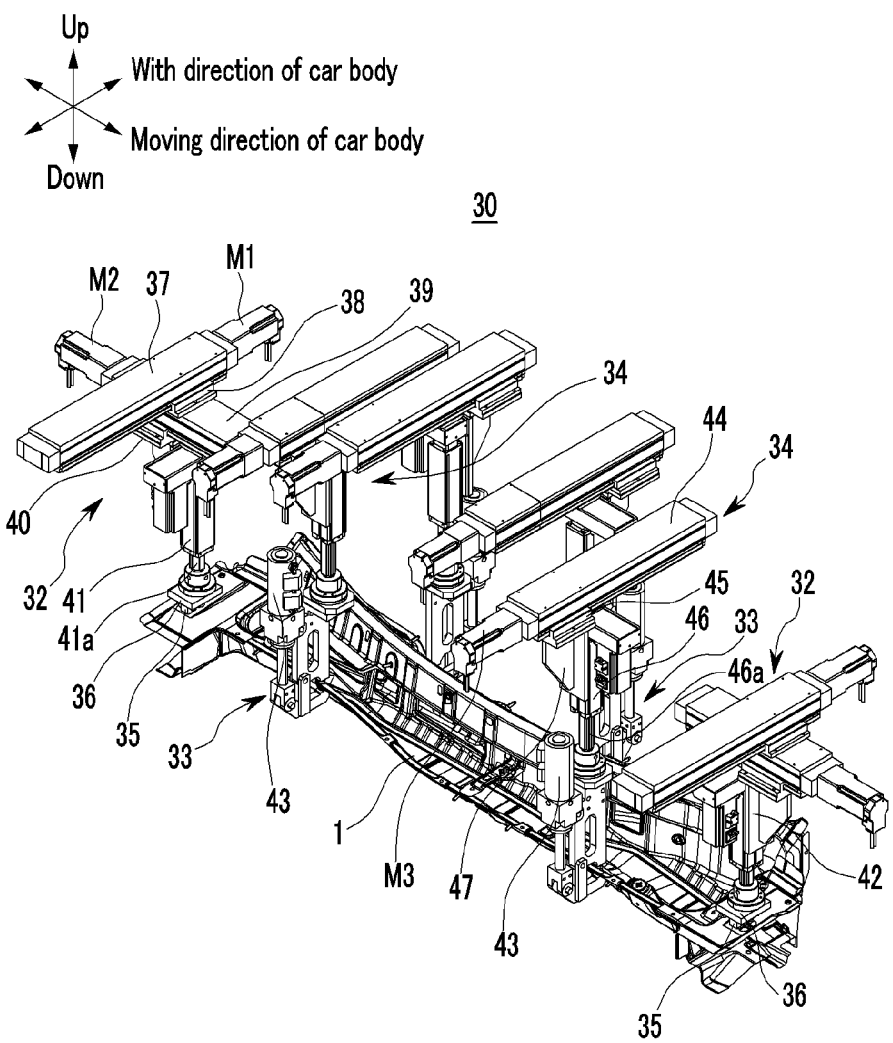
FIG. 2 and FIG. 3 are perspective views of a first aligning unit applied to a common CRP cart for multiple vehicle models according to an embodiment of the present invention.
Figure 3:
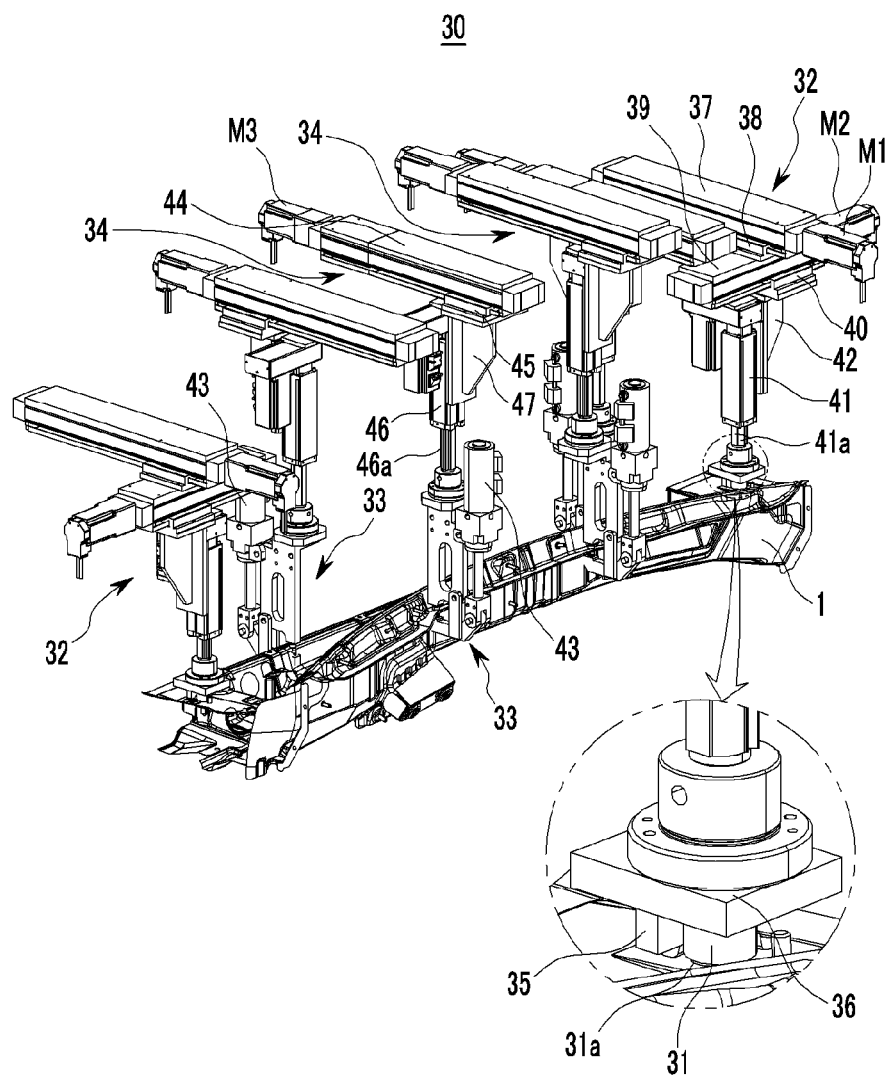

FIG. 2 and FIG. 3 are perspective views of a first aligning unit applied to a common CRP cart 100 according to an exemplary embodiment of the present invention.

As shown in FIG. 2 and FIG. 3, the first aligning unit 30 is disposed at a front portion of the frame 10, and includes a first aligning pin 31, a first driving portion 32, a first clamper 33, a second driving portion 34, and a first pusher 35.

The first aligning pin 31 is insertable in a positioning hole 31a, which may be formed on both/opposing sides of the cowl panel 1. Insertion of the first aligning pin 31 in the positioning hole 31a properly positions the cowl panel 1 (positions the cowl panel 1 at a predetermined position). The first aligning pin 31 can be movable so as to correspond to various positioning holes of a variety of cowl panels 1. Thus, the first aligning pin 31 can be moved to correspond with positioning holes of various vehicle models having different specifications.

The first aligning pin 31 may be mounted to a mounting block 36 connected with the first the driving portion 32.

The first driving portion 32 may move the first aligning pin 31 along the moving direction, the width direction and the height direction of the vehicle body. As such, the aligning pin 31 can be suitably adjusted to correspond to positioning holes 31a of a variety of vehicle models having different specifications.

The first driving portion 32 may be a three-dimensional motor cylinder and may be configured and arranged to move the mounting block 36 along the moving direction, the width direction and the height direction (upward/downward) of the vehicle body.

As shown, the first driving portion 32 can includes a first driving body 37 which converts rotary motion of a first motor M1 into liner motion, a first moving member 38 which is connected to the first driving body 37 and which is movable along the moving direction of the vehicle body, a second driving body 39 which is connected to the first moving member 38 and which converts rotary motion of a second motor M2 to liner motion, a second moving member 40 which is connected to the second driving body 39 and which is movable along the width direction of the vehicle body, and a first operation cylinder 41 which is connected to the second moving member 40 and which moves the mounting block 36 upwards and downwards.

The first driving body 37 may include a ball screw (not shown) in connection with the first motor M1 and may be disposed along the moving direction of the vehicle body. The first moving member 38 may be in connection with the ball screw.

The second driving body 39 may include a ball screw (not shown) in connection with the second motor M2 and may be disposed along the width direction of the vehicle body, and the second moving member 40 may be in connection with the ball screw.

The ball screw may move each moving member 38 and 40 by rotation of the motor. The general configuration, scheme and operation of the ball screw can be in accordance with conventional ball screws, and thus a detailed description thereof will be omitted in the specification.

As shown, the first operation cylinder 41 is connected with the second moving member 40 through a first connecting bracket 42, and an operation rod 41a of the first operation cylinder 41 is connected with the mounting block 36.

The first clamper 33 is adapted to clamp an edge of the cowl panel 1, preferably both/opposing edges of the cowl panel 1 along a length direction thereof. Thus, for example, a plurality of first clampers 33 may be disposed along the edges of the cowl panel 1 so as to clamp to cowl panel 1 at any number of locations along the length of the cowl panel 1.

The first clamper 33 is movable along the moving direction and the height direction of the vehicle body, such as by means of a second driving portion 34, and may clamp edges of the cowl panel 1 though a first clamp cylinder 43.

The first clamper 33 may be a clamping apparatus having a general structure and configuration of any known clamping apparatus and, thus, a detailed description thereof will be omitted in the specification.

The second driving portion 34 may be a two-dimensional motor cylinder which may move the first clamper 33 along the moving direction of the vehicle body and the height direction of the vehicle body.

As shown in the figures, the second driving portion 34 includes a third driving body 44 which is configured and arranged to convert rotary motion of a third motor M3 to liner motion, a third moving member 45 which is connected to the third driving body 44 and is movable along the moving direction of the vehicle body and a second operation cylinder 46 which is connected to the third moving member 45 and moves the first clamper 33 upwards and downwards.

The third driving body 44 may include a ball screw in connection with the third motor M3 and may be disposed along the moving direction of the vehicle body. The third moving member 45 may also be in connection with the ball screw.

As shown, the second operation cylinder 46 is connected with the third moving member 45 through a second connecting bracket 47, and an operation rod 46a of the second operation cylinder 46 is connected with the first clamper 33.

In this case, the first clamper 33 may be a swivel clamper which may improve the ability of the first clamper to match clamping surface characteristics of the cowl panel 1 despite variations in slope. The first clamper 33 may be connected to the operation rod 46a of the second operation cylinder 46 in a swiveling manner, such as through a ball joint and a spring (which are not shown).

The first pusher 35 is configured and arranged to push a matching portion of the cowl panel 1, which is matched up with the vehicle body, to prevent disengagement of the matching portions.

Since the matching portion of the cowl panel 1 and the first aligning pin 31 abut each other, the first pusher 35 may be mounted to the mounting block 36 at a position where the first aligning pin 31 is mounted thereto.

The first pusher 35 may be a block for pushing the matching portion of the cowl panel 1 towards the vehicle body, and may be disposed at the mounting block 36 near the first aligning pin 31.

In an exemplary embodiment of the present invention as shown in FIG. 1, the second aligning unit 50 may accurately clamp the roof rails 2a and 2b of various vehicle models having different specifications, and the second aligning unit 50 may disposed at another portion of the frame 10 (i.e. at a portion of the frame 10 different than the portion at which the first aligning unit 30 is disposed).

For example, as shown in FIG. 1, the second aligning unit 50 may be disposed at a rear position of the frame 100 with respect to the first aligning unit 30, and may clamp a front roof rail 2a and a rear roof rail 2b of the vehicle body respectively.

In particular, a pair of second aligning units 50 may be provided disposed between the first aligning unit 30 and the third aligning unit 70, and may be arranged for clamping the front roof rail 2a and the rear roof rail 2b.

Since each of the second aligning units 50 can have the same structure for clamping the front roof rail 2a and the rear roof rail 2b, in an exemplary embodiment of the present invention, clamping of the front roof rail 2a (hereinafter, referred to as "roof rail" for convenience) will described and will similarly apply to clamping the rear roof rail 2b.

Figure 4:
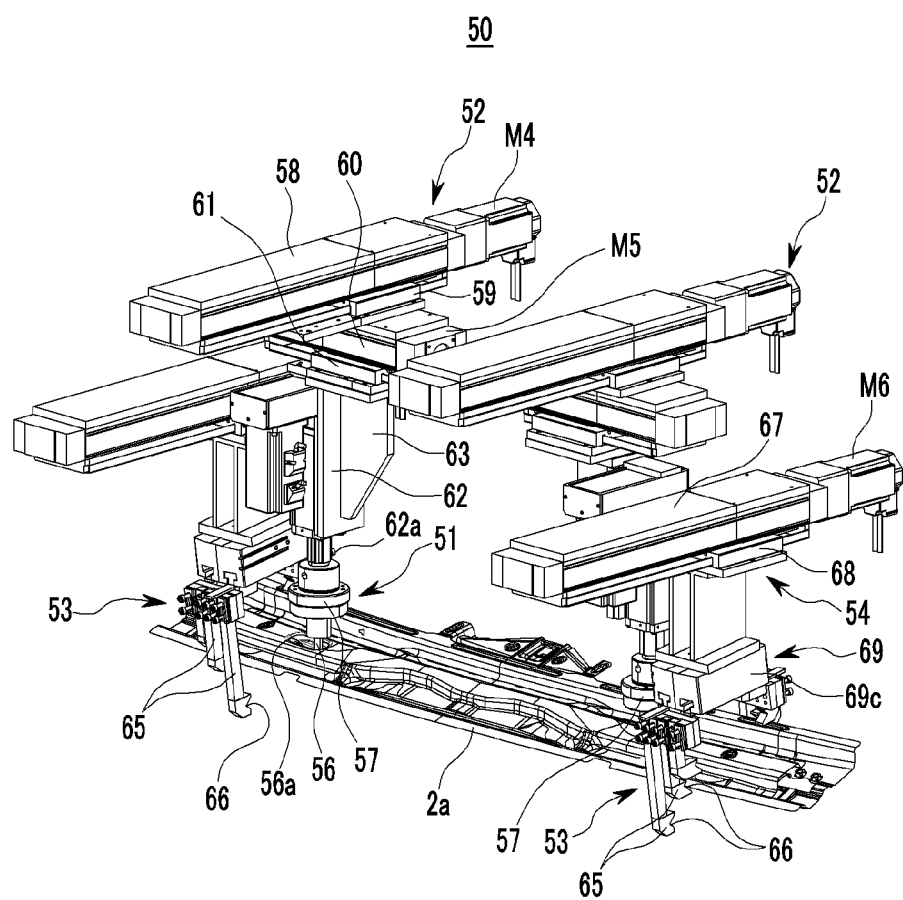
FIG. 4 and FIG. 5 are perspective views of a second aligning unit applied to a common CRP cart for multiple vehicle models according to an embodiment of the present invention.
Figure 5:
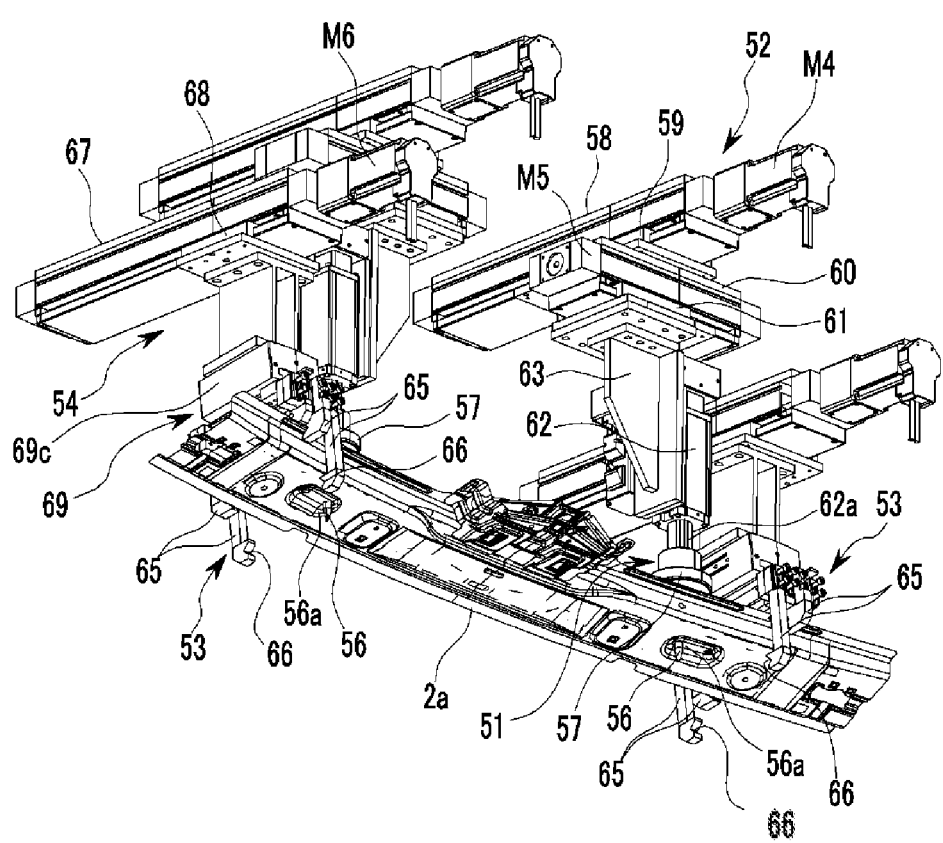

FIG. 4 and FIG. 5 are perspective views of a second aligning unit applied to a common CRP cart for multiple vehicle models according to an exemplary embodiment of the present invention.

Referring to FIG. 4 and FIG. 5, the second aligning unit 50 according to an exemplary embodiment of the present invention includes a first pin clamper 51, a third driving portion 52, a holding portion 53, and a fourth driving portion 54.

As shown, the first pin clamper 51 includes a second aligning pin 56 which is insertable into a positioning hole 56a formed to the roof rail 2a so as to accurately position the roof rail 2a.

The first pin clamper 51 is adapted to be movable so as to correspond to roof rail 2a positioning holes 56a of various vehicle models having different specifications.

The first pin clamper 51 may be mounted to a mounting block 57 connected with the third driving portion 52.

The third driving portion 52 may move the first pin clamper 51 along the moving direction, the width direction and height direction of the vehicle body. As such, the first pin clamper 51 may be suitably moved so as to correspond to roof rail 2a positioning holes 56a of various vehicle models having different specifications.

The third driving portion 52 may be a three-dimensional motor cylinder and may move the mounting block 57 along the moving direction, the width direction and the height direction (upward/downward) of the vehicle body.

The third driving portion 52 includes a fourth driving body 58 which converts rotary motion of a fourth motor M4 into liner motion, a fourth moving member 59 which is connected to the fourth driving body 58 and is movable along the moving direction of the vehicle body, a fifth driving body 60 which is connected to the fourth moving member 59 and which converts rotary motion of a fifth motor M5 into liner motion, a fifth moving member 61 which is connected to the fifth driving body 60 and is movable along the width direction of the vehicle body, and third operation cylinder 62 which is connected to the fifth moving member 61 and which moves the mounting block 57 upwards and downwards.

The fourth driving body 58 may include a ball screw in connection with the fourth motor M4 and may be disposed along the moving direction of the vehicle body. The fourth moving member 59 may further be in connection with the ball screw.

The fifth driving body 60 may include a ball screw in connection with the fifth motor M5 and may be disposed along the width direction of the vehicle body. The fifth moving member 61 may further be in connection with the ball screw.

The third operation cylinder 62 may further be in connection with the fifth moving member 61 through a connecting bracket 63, and an operation rod 62a of the third operation cylinder 62 may be in connection with the mounting block 57.

The holding portion 53 may be configured to press and clamp the roof rail 2a. As shown, a pair of holding portions 53 may be provided corresponding to the roof rail 2a.

The holding portion 53 may be provided with a plurality of holding fingers 65 which may be movable along a width direction of the roof rail 2a.

The holding fingers 65 may open towards each other, and may close to clamp the roof rail 2a along the width direction of the roof rail 2a.

For example, the holding fingers 65 may be movable along the width direction of the roof rail 2a which can be generally in a block-like shape. The holding fingers 65 may be provided with clamping grooves 66 which can be are formed on opposite sides of the roof rail 2a in "V"-like or similar suitable shapes.

By providing the holding fingers 65 with clamping grooves 66, which may be suitably shaped (e.g. "V"-shaped), edges of the roof rail 2a may be easily guided and clamped.

The holding portion 53 may be moved along the moving direction of the vehicle body by means of the fourth driving portion 54.

As shown, the fourth driving portion 54 includes a sixth driving body 67 which converts rotary motion of a sixth motor M6, and a sixth moving member 68 which is connected to the sixth driving body 67 and is movable along the moving direction of the vehicle body.

The sixth driving body 67 may include a ball screw in connection with the sixth motor M6 and may be disposed along the moving direction of the vehicle body, and the sixth moving member 68 may be in connection with the ball screw.

A fifth driving portion 69 may be connected with the fourth driving portion 54, and may move the holding fingers 65 along the width direction of the roof rail 2a.

The fifth driving portion 69 may be a width adjusting cylinder 69c in connection with the sixth moving member 68. The width adjusting cylinder 69c may be in connection with the holding fingers 65, and the holding fingers 65 may be moved along the width direction of the roof rail 2a by operation of the width adjusting cylinder 69c.

In an exemplary embodiment of the present invention, the third aligning unit 70, as shown in FIG. 1, is capable of clamping a variety of package trays 3 of various vehicle models having different specifications. As shown in FIG. 1, the third aligning unit 70 may be disposed on the other portion of the frame 10 (wherein the "other" portion is a common portion on which the second aligning unit 50 is also disposed).

For example, as shown in FIG. 1, the third aligning unit 70 may be disposed to a rear portion of the frame 10 relative to the second aligning unit 50.

Figure 6:
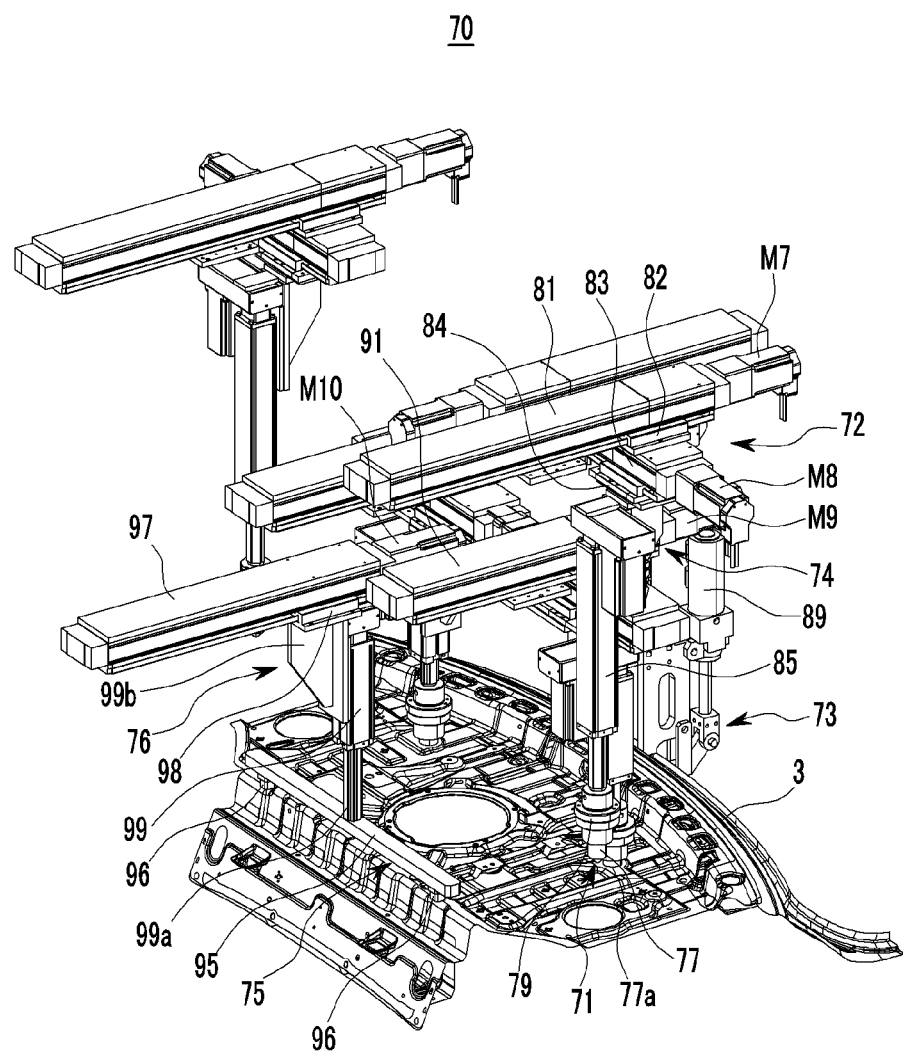
FIG. 6 and FIG. 7 are perspective views of a third aligning unit applied to a common CRP cart for multiple vehicle models according to an embodiment of the present invention.
Figure 7:
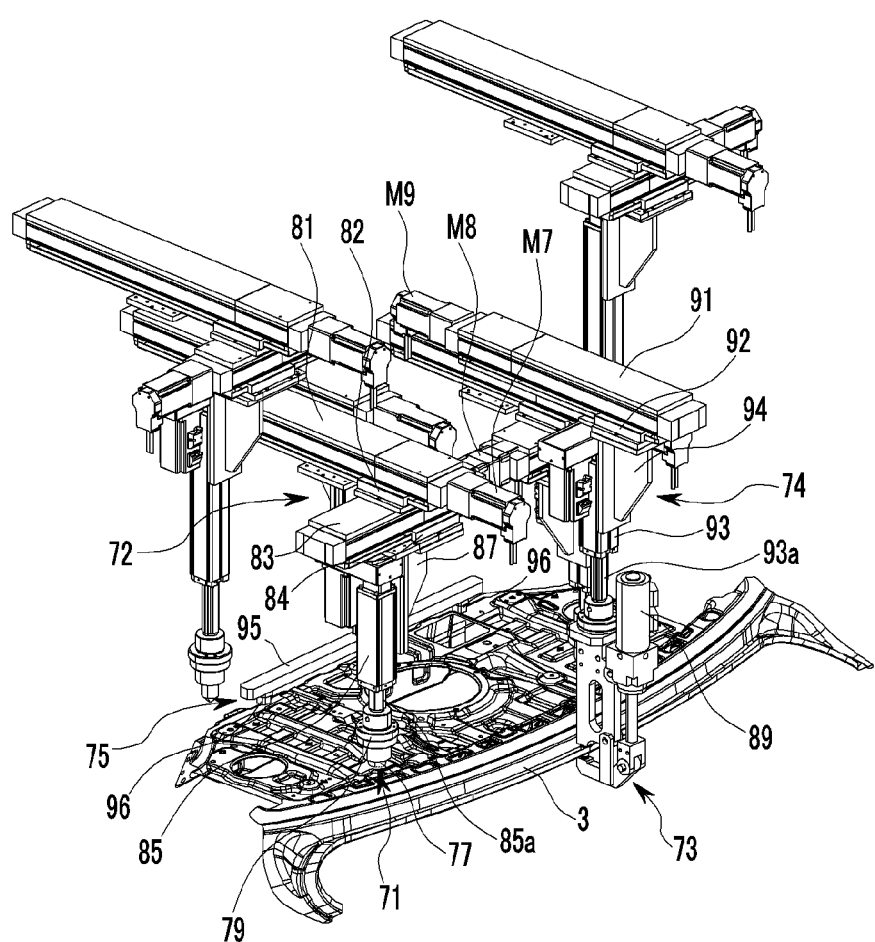

FIG. 6 and FIG. 7 are perspective views of a third aligning unit applied to a common CRP cart for multiple vehicle models according to an exemplary embodiment of the present invention.

Referring to FIG. 6 and FIG. 7, the third aligning unit 70 according to an exemplary embodiment of the present invention includes a second pin clamper 71, a sixth driving portion 72, a second clamper 73, a seventh driving portion 74, the second pusher 75 and an eighth driving portion 76.

The second pin clamper 71 includes a third aligning pin 77 which is insertable into a positioning hole 77a formed to the package tray 3 so as to properly position the package tray 3.

The second pin clamper 71 is adapted to be movable so as to correspond to positioning holes 77a of various vehicle model package trays 3 having different specifications.

The second pin clamper 71 may be mounted to a mounting block 79 connected with the sixth driving portion 72.

The sixth driving portion 72 may move the second pin clamper 71 along the moving direction, the width direction and height direction of the vehicle body so as to correspond to the positioning hole 77a of various vehicle model package trays 3.

The sixth driving portion 72 may be a three-dimensional motor cylinder and may move the mounting block 79 along the moving direction, the width direction and the height direction (upward/downward) of the vehicle body.

As shown, the sixth driving portion 72 may include a seventh driving body 81 which converts rotary motion of a seventh motor M7 into liner motion, a seventh moving member 82 which is connected to the seventh driving body 81 and is movable along the moving direction of the vehicle body, an eighth driving body 83 which is connected to the seventh moving member 82 and converts rotary motion of the eighth motor M8 into liner motion, an eighth moving member 84 which is in connection with the eighth driving body 83 and is movable along the width direction of the vehicle body, and a fourth operation cylinder 85 which is in connection with the eighth moving member 84 and move the mounting block 79 upwards and downwards.

The seventh driving body 81 may include a ball screw in connection with the seventh motor M7, and may be disposed along the moving direction of the vehicle body. The seventh moving member 82 may also be in connection with the ball screw.

The eighth driving body 83 may include a ball screw in connection with the eighth motor M8 and may be disposed along the width direction of the vehicle body. The eighth moving member 84 may further be in connection with the ball screw.

As shown, the fourth operation cylinder 85 is in connection with the eighth moving member 84 through a fourth connecting bracket 87, and the mounting block 79 is connected to an operation rod of the fourth operation cylinder 85.

The second clamper 73 may clamp one or more edges of the package tray 3. One or more second clampers 73 may suitably be disposed along the edge of the package tray 3.

In particular, the second clamper 73 is movable along the moving direction and the height direction of the vehicle body, such as by means of a seventh driving portion 74, and may be positioned to clamp a rear edge of the package tray 3 though a second clamp cylinder 89.

The second clamper 73 may generally be in accordance with a conventional clamping apparatus and, thus, a detailed description thereof will be omitted in the specification.

The seventh driving portion 74 may be a two-dimensional motor cylinder which may move the second clamper 73 along the moving direction of the vehicle body and the height direction of the vehicle body.

The seventh driving portion 74 may include a ninth driving body 91 which converts rotary motion of a ninth motor M9 into liner motion, a ninth moving member 92 which is connected to the ninth driving body 91 and is movable along the moving direction of the vehicle body, and a fifth operation cylinder 93 which is connected to the ninth moving member 92 and moves the second clamper 73 upwards or downwards.

The ninth driving body 91 may include a ball screw in connection with the ninth motor M9 and may be disposed along the moving direction of the vehicle body. The ninth moving member 92 may also be in connection with the ball screw.

As shown, the fifth operation cylinder 93 is in connection with the ninth moving member 92 through a fifth connecting bracket 94, and an operation rod 93a of the fifth operation cylinder 93 is in connection with the second clamper 73.

In this case, the second clamper 73 may be a swivel-type clamper which may improve its ability to match clamping surface characteristics of the package tray 3 despite variations in slope. The second clamper 73 may be connected to the operation rod 93a of the fifth operation cylinder 93 in a swiveling manner through a suitable mechanism such as a ball joint and a spring (which are not shown).

The second pusher 75 is configured and arranged to push a portion of the package tray 3 which is matched up with the vehicle body so as to prevent disengagement of the matching portions.

As shown, the second pusher 75 can include a push bar 95 which is disposed along a length direction of the package tray 3 (along the width direction of the vehicle body), and push blocks 96 which may be disposed at both/opposing ends of the push bar 95 for pushing/engaging a matching portion of the package tray 3.

The push bar 95 may push the matching portion of the package tray 3 towards the vehicle body. Thus, for example, the push bar 95 may be connected to the eighth driving portion 76 and may be movable along the moving direction of the vehicle body and height direction by means of the eighth driving portion 76.

The push block 96 may be a block configured and arranged for pushing the matching portion of the package tray 3 towards the vehicle body, and may be disposed at a lower portion of the push bar 95.

The eighth driving portion 76 may be a two-dimensional motor cylinder which may move the push bar 95 along the moving direction of the vehicle body and the height direction of the vehicle body.

The eighth driving portion 76 may include a tenth driving body 97 which converts rotary motion of a tenth motor M10 into liner motion, a tenth moving member 98 which is connected to the tenth driving body 97 and is movable along the moving direction of the vehicle body, and a sixth operation cylinder 99 which is connected to the tenth moving member 98 and moves the push bar 95 upwards and downwards.

The tenth driving body 97 may include a ball screw in connection with the tenth motor M10 and may be disposed along the moving direction of the vehicle body. The tenth moving member 98 may also be in connection with the ball screw.

The sixth operation cylinder 99 may be in connection with the tenth moving member 98 through a sixth connecting bracket 99b, and an operation rod 99a of the sixth operation cylinder 99 may be in connection with the push bar 95.

Hereinafter, operations of the common CRP cart 100 according to an exemplary embodiment of the present invention will be described referring to the drawings.

The CRP cart 100 according to an exemplary embodiment of the present invention may simultaneously clamp the cowl panel 1, the roof rails 2a and 2b and the package tray 3 for assembly into a vehicle body.

For easier understanding, clamping of the cowl panel 1, the roof rail 2a and 2b and the package tray 3 by the first aligning unit 30, the second aligning unit 50 and the third aligning unit 70 will be described in series.

The first driving portion 32 of the first aligning unit 30 moves the first aligning pins 31 along the moving direction, the width direction and the height direction of the vehicle body so as to correspond to the various positioning holes 31a of the cowl panel 1. As such, it is possible to suitably position the aligning pins 31 so as to correspond to positioning holes 31a having different specifications (i.e. for various vehicle models).

After the first aligning pins 31 are suitably positioned, they are inserted into each positioning hole 31a formed to the cowl panel 1 so as to correctly position the cowl panel 1 (at a predetermined position).

In this case, the first pusher 35 moves together with the first aligning pin 31 and pushes a portion near the positioning hole 31a. Thus, the first pusher 35 can push the matching portion of the cowl panel 1 towards the vehicle body where the vehicle body is matched up so as to prevent disengagement of the matched portions.

Further, the first clamper 33 moves along the moving direction of the vehicle body and height direction by means of the second driving portion 34, and clamps the edges of the cowl panel 1 by means of the first clamp cylinder 43.

In this case, the first clamper 33 may be a swivel clamper connected to the operation rod 46a of the second operation cylinder 46 in a swiveling manner, such as through a ball joint and a spring. As such, matching characteristics of a clamping surface of the cowl panel 1 may be improved despite variations in slope.

Meanwhile, the third driving portion 52 of the second aligning unit 50 moves the first pin clamper 51 corresponding to various positioning holes 31a of the roof rail 2a and 2b along the moving direction, the width direction and the height direction of the vehicle body.

The second aligning pin 56 is then inserted into each positioning hole 56a formed to the roof rail 2a and 2b so as to properly position the roof rail 2a and 2b (at a predetermined position).

In this case, the holding portion 53 moves along the moving direction of the vehicle body by means of the fourth driving portion 54, and the holding fingers 65 of the holding portion 53 are closed along the width direction of the roof rail 2a and 2b by means of the fifth driving portion 69.

Thus, the holding fingers 65 of the holding portion 53 may push and clamp the roof panel 2a and 2b.

In embodiments wherein the holding fingers 65 are provided with the clamping grooves 66 in a "V" shaped, guiding and clamping edges of the roof rail 2a and 2b may be more easily performed.

Further, the sixth driving portion 72 of the third aligning unit 70 moves the second pin clamper 71 along the moving direction, the width direction and the height direction of the vehicle body so as to correspond to the various positioning holes 77a of package trays 3 of various vehicle models.

After alignment, the third aligning pin 77 of the second pin clamper 71 is inserted into the positioning hole 77a formed in the package tray 3 to properly position the package tray 3 (at a predetermined position).

The second clamper 73 is moved along the moving direction of the vehicle body by means of the seventh driving portion 74, and clamps the edge of the package tray 3 by means of the second clamp cylinder 89.

In this case, the second clamper 73 may be the swivel type of clamper connected to the operation rod 93a of the fifth operation cylinder 93, and may be movable in a swiveling manner through suitable means such as a ball joint and a spring. As such, the ability of the second clamper 73 to match clamping surface characteristics of the package tray 3 may be improved despite variations in slope.

Further, the push bar 95 of the second pusher 75 is moved along the moving direction and the height direction of the vehicle body by means of the eighth driving portion 76, and the push block 96 pushes/engages the matching portion of package tray 3.

In particular, the second pusher 75 pushes the matching portion of package tray 3 towards the matching portion of the vehicle body where the vehicle body is matched up so as to prevent disengagement of the matched portions.

As described above, according to an exemplary embodiment of the present invention when the cowl panel 1, the roof rail 2a and 2b and the package tray 3 are clamped by means of the first aligning unit 30, the second aligning unit 50 and the third aligning unit 70, the common CRP cart 100 is transported to an upper portion of the wording room of the vehicle body build-up process along the moving direction of the vehicle body by the moving apparatus.

Thereafter, the CRP cart 100 moves from the upper portion of the working room to the lower portion of the working room toward the vehicle body by used of the moving apparatus so as to match up the frame 10 with the side gate.

Then the frame 10 is connected to the side gate through the pin block unit 20.

As described above, the common CRP cart 100 according to an exemplary embodiment of the present invention may clamp the cowl panel 1, the roof rail 2a and 2b and the package tray 3 of various vehicle models having different specifications by using the first aligning unit 30, the second aligning unit 50 and the third aligning unit 70.

As such, cowl panels 1, roof rails 2a and 2b and package trays 3 of various vehicle models, which have different specifications, may be flexibly assembled using the common CRP cart 100.

In contrast with conventional devices and methods, since the cowl panel 1, the roof rail 2a and 2b and the package tray 3 of various vehicle models having different specifications may be flexibly assembled by the present apparatus, mass production of various vehicle models may be realized more easily, working hours may be reduced, and initial investment costs can be decreased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A common CRP cart for multiple vehicle models which may clamp a cowl panel, a roof rail and a package tray for assembling a vehicle body, and which is movable upward and downward at a working room for a build-up process, the common CRP cart comprising:
   a frame;
   a first aligning unit connected to one portion of the frame and being configured and arranged for clamping a cowl panel of various vehicle models having different specifications;
   a second aligning unit connected to another portion of the frame and being configured and arranged for clamping a roof rail of various vehicle models having different specifications; and
   a third aligning unit connected to the another portion of the frame and being configured and arranged for clamping a package tray of various vehicle models having different specifications,
   wherein the first aligning unit comprises:
      at least one first aligning pin movable so as to correspond to a position of the cowl panel;
      a first driving portion which is a three-dimensional motor cylinder and which is in connection with the at least one first aligning pin so as to move the at least one first aligning pin along a moving direction of the vehicle body, a width direction of the vehicle body, and along upward/downward directions of the vehicle body; and
      at least one first clamper configured and arranged for clamping the cowl panel, and
   wherein the second aligning unit comprises:
      a first pin clamper comprising at least one second aligning pin movable corresponding to a position of the roof rail of various vehicle models having different specifications;
      a third driving portion which is a three-dimensional motor cylinder and which is configured and arranged to move the first pin clamper along a moving direction of the vehicle body, a width direction of the vehicle body, and along upward/downward directions of the vehicle body;

a holding portion which is configured and arranged to push and clamp the roof rail along a width direction of the roof rail; and a fourth driving portion which is configured and arranged to move the holding portion along a moving direction of the vehicle body, wherein the holding portion is provided with a plurality of holding fingers which are movable along the width direction of the roof rail, wherein the holding fingers are movable along the width direction of the roof rail by operation of a fifth driving portion connected to the fourth driving portion, wherein the third aligning unit comprises:

a second pin clamper comprising at least one third aligning pin movable so as to corresponding to a position of the package tray;

a sixth driving portion which is a three-dimensional motor cylinder and which is configured and arranged to move the second pin clamper along a moving direction of the vehicle body, and width direction of the vehicle body, and along upward/downward directions of the vehicle body; and at least one second clamper configured and arranged for clamping the package tray, wherein the third aligning unit further comprises:

a second pusher configured and arranged for pushing the package tray; and an eighth driving portion which is a two-dimensional motor cylinder and which is configured and arranged to move the second pusher along the moving direction of the vehicle body, and along an upward and downward direction of the vehicle body, and wherein the second pusher comprises:

a push bar which is connected to the eighth driving portion and disposed along a length direction of the package tray; and push blocks which are disposed at both ends of the push bar and are configured and arranged to push a matching portion of the package tray.

2. The common CRP cart of claim 1, wherein the first aligning unit further comprises a second driving portion which is a two-dimensional motor cylinder and which is configured and arranged to move the first clamper along the moving direction of the vehicle body, and along the upward and the downward directions of the vehicle body.

3. The common CRP cart of claim 2, wherein the first clamper is a swivel clamper configured and arranged to improve matching with a clamping surface of the cowl panel despite variations in slope.

4. The common CRP cart of claim 1, wherein:
the at least one first aligning pin is mounted to a mounting block connected to the first driving portion; and
the mounting block is provided with a first pusher which is configured and arranged to push a matching portion of the cowl panel.

5. The common CRP cart of claim 1, wherein a pair of second aligning units are positioned between the first and the third aligning units and are configured and arranged for clamping a front roof rail and a rear roof rail respectively.

6. The common CRP cart of claim 1, wherein the holding fingers are provided with clamping grooves configured to be disposed on opposite sides of the roof rail and which are V-shaped.

7. The common CRP cart of claim 1, wherein the third aligning unit further comprises a seventh driving portion which is a two-dimensional motor cylinder and which is configured and arranged to move the second clamper along the moving direction of the vehicle body, and along the upward and the downward directions of the vehicle body.

8. The common CRP cart of claim 7, wherein the second clamper is a swivel clamper which is configured and arranged to match a clamping surface of the package tray despite variations in slope.

9. The common CRP cart of claim 1, further comprising a pin block unit which is mounted to the frame in a vehicle body build-up process.

* * * * *